(12) United States Patent
Fadhel et al.

(10) Patent No.: US 10,252,243 B2
(45) Date of Patent: Apr. 9, 2019

(54) ACTIVATION OF WASTE METAL OXIDE AS AN OXYGEN CARRIER FOR CHEMICAL LOOPING COMBUSTION APPLICATIONS

(71) Applicant: Saudi Arabian Oil Company, Dhahran (SA)

(72) Inventors: Bandar A Fadhel, Dammam (SA); Zaki Yusuf, Dhahran (SA); Ahmad D. Hammad, Dhahran (SA); Ali Hoteit, Abqaiq (SA); Per Tobias Mattisson, Torslanda (SE)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 53 days.

(21) Appl. No.: 15/485,051

(22) Filed: Apr. 11, 2017

(65) Prior Publication Data
US 2017/0259240 A1    Sep. 14, 2017

Related U.S. Application Data

(62) Division of application No. 14/294,621, filed on Jun. 3, 2014, now abandoned.

(51) Int. Cl.
*B01J 20/06*    (2006.01)
*C10J 3/46*    (2006.01)
(Continued)

(52) U.S. Cl.
CPC ............ *B01J 20/06* (2013.01); *B01J 8/0055* (2013.01); *B01J 8/0065* (2013.01); *B01J 8/08* (2013.01);
(Continued)

(58) Field of Classification Search
CPC ..... B01J 20/06; B01J 8/24; B01J 23/00; B01J 20/0229; C01G 45/02; C01G 49/02;
(Continued)

(56) References Cited

U.S. PATENT DOCUMENTS 4,367,160 A    1/1983   Rooks
5,447,024 A    9/1995   Ishida et al.
(Continued)

FOREIGN PATENT DOCUMENTS

CN    101824353    9/2010
CN    102517122    6/2012
(Continued)

OTHER PUBLICATIONS

Magnus Ryden et al. "Chemical-Looping Combustion with Liquid Fuels" Energy Procedia 37 (2013) 654-661 (Year: 2013).*
(Continued)

*Primary Examiner* — Peter F Godenschwager
*Assistant Examiner* — Andrew J. Oyer
(74) *Attorney, Agent, or Firm* — Leason Ellis LLP

(57) ABSTRACT

A process for producing black powder oxygen carriers for use in a chemical looping combustion unit includes the steps of: (a) removing and collecting the black powder waste material that was formed in a gas pipeline; (b) pre-treating the collected black powder to adjust its spherical shape to avoid attrition and fines production; and (c) activating the black powder to increase its reactivity rate and produce the black powder oxygen carrier that is suitable for use in the chemical looping combustion process as an oxygen carrier.

14 Claims, 5 Drawing Sheets

(51) Int. Cl.

| | | |
|---|---|---|
| *F23C 13/08* | (2006.01) | |
| *C01B 32/50* | (2017.01) | |
| *C10J 3/84* | (2006.01) | |
| *C10J 3/52* | (2006.01) | |
| *B01J 20/34* | (2006.01) | |
| *B01J 20/30* | (2006.01) | |
| *B01J 20/28* | (2006.01) | |
| *F23C 10/24* | (2006.01) | |
| *B01J 8/00* | (2006.01) | |
| *B01J 8/38* | (2006.01) | |
| *B01J 8/12* | (2006.01) | |
| *C10G 45/02* | (2006.01) | |
| *C01G 49/02* | (2006.01) | |
| *B01J 20/02* | (2006.01) | |
| *C01B 5/00* | (2006.01) | |
| *C01G 45/02* | (2006.01) | |
| *F23C 10/10* | (2006.01) | |
| *B01J 8/08* | (2006.01) | |

(52) U.S. Cl.
CPC ............... *B01J 8/12* (2013.01); *B01J 8/388* (2013.01); *B01J 20/0229* (2013.01); *B01J 20/28016* (2013.01); *B01J 20/3078* (2013.01); *B01J 20/3085* (2013.01); *B01J 20/3433* (2013.01); *C01B 5/00* (2013.01); *C01B 32/50* (2017.08); *C01G 45/02* (2013.01); *C10J 3/463* (2013.01); *C10J 3/523* (2013.01); *C10J 3/84* (2013.01); *F23C 10/10* (2013.01); *F23C 10/24* (2013.01); *F23C 13/08* (2013.01); *C01P 2006/21* (2013.01); *C01P 2006/80* (2013.01); *C10J 2300/093* (2013.01); *C10J 2300/0943* (2013.01); *C10J 2300/0959* (2013.01); *C10J 2300/0993* (2013.01); *C10J 2300/1631* (2013.01); *C10J 2300/1807* (2013.01); *F23C 2900/99008* (2013.01); *Y02E 20/346* (2013.01); *Y02P 20/128* (2015.11)

(58) Field of Classification Search
CPC ........ F23C 10/005; F23C 99/00; F23C 13/05; F23C 10/01; F23C 2900/99008; C01B 31/20; C01B 5/00; C01P 2006/21; C01P 2006/80

See application file for complete search history.

(56) References Cited

U.S. PATENT DOCUMENTS

| | | |
|---|---|---|
| 7,767,191 B2 | 8/2010 | Thomas et al. |
| 7,855,171 B2 | 12/2010 | Trahan |
| 2011/0054049 A1 | 3/2011 | Lambert et al. |
| 2011/0171588 A1 | 7/2011 | Gauthier et al. |
| 2011/0300060 A1 | 12/2011 | Guillou et al. |
| 2012/0148484 A1 | 6/2012 | Gauthier et al. |
| 2012/0214106 A1 | 8/2012 | Sit et al. |
| 2013/0118957 A1 | 5/2013 | Hoteit et al. |
| 2014/0130666 A1 | 5/2014 | Cabourdin |

FOREIGN PATENT DOCUMENTS

| | | |
|---|---|---|
| EP | 2644994 | 10/2013 |
| JP | 2014-025506 | 2/2014 |
| WO | WO 2011/070450 | 6/2011 |

OTHER PUBLICATIONS

Golnar Azimi et al: "Investigation of Different Mn—Fe Oxides as Oxygen Carrier for Chemical-Looping with Oxygen Uncoupling (CLOU)", Energy & Fuels, vol. 27. No. 1, Jan. 17, 2013 (Jan. 17, 2013), pp. 367-377, XP055211666, ISSN: 0887-0624, DOI: 10.1021/ef301120r Results the whole document.

Magnus Ryden et al: "Chemical-Looping Combustion with Liquid Fuels", Energy Procedia, vol. 37, Jan. 1, 2013 (Jan. 1, 2013), pp. 654-661, XP055211657, ISSN: 1876-6102, DOI: 10.1016/j.egypro. 2013.05.153 4.1 Related Results the whole document.

Golnar Azimi, Henrik Leion, Magnus Ryden, Tobias Mattissonm and Anders.

Lyngfelt "Investigation of Different Mn—Fe Oxides as Oxygen Carrier for Chemical-Looping with Oxygen Uncoupling (CLOU)" Energy Fuels 2013, 27, 367-377. Published Nov. 23, 2012.

* cited by examiner

ACTIVATION OF WASTE METAL OXIDE AS AN OXYGEN CARRIER FOR CHEMICAL LOOPING COMBUSTION APPLICATIONS

CROSS-REFERENCE TO RELATED PATENT APPLICATIONS

This application is a divisional of U.S. patent application Ser. No. 14/294,621, filed Jun. 3, 2014, the entire contents of which is incorporated by reference herein as if expressly set forth in its respective entirety herein.

TECHNICAL FIELD

The present invention relates to a process to produce energy, syngas, hydrogen, and heat, etc. by means of a chemical looping combustion scheme. More specifically, the present invention relates to the utilization of a gas pipeline waste material (which was previously discarded) as the oxygen carrier in a chemical looping combustion scheme.

BACKGROUND

The increased attention paid to global warming in recent decades has led to increased research in the field of power generation. Different measures for fighting against the undesirable effects of global warming have been proposed. One such measure is carbon capture and storage (CCS), which has widely been considered a mid-to-long term mitigating measure against the emission of $CO_2$. CCS has the potential to be both valuable and environmental, and this can be achieved if $CO_2$ can be utilized in industrial applications after it has been captured. For example, $CO_2$-EOR (Enhanced Oil Recovery by injecting $CO_2$ into oil reservoirs) is a potential industrial usage of $CO_2$ that increases petroleum production. This process has been commercially used for approximately 40 years, typically utilizing $CO_2$ from natural resources, and its feasibility has been well recognized in terms of transportation and injection of $CO_2$. Nevertheless, the biggest problem with CCS lies not with the potential industrial uses of the captured $CO_2$, but rather with the costliness of current CCS processes.

Combustion is a commonly used reaction in the field of power generation. Several carbon capturing techniques exist for capturing $CO_2$ from a combustion unit, including post-treatment, $O_2/CO_2$ firing (oxyfuel), and CO-shift. These $CO_2$ capture techniques all suffer from the fact that very significant gas separation steps are needed. Moreover, these gas separation steps involve very significant operational costs as well as large energy penalties, estimated in the order of about 10 percentage points of plant efficiency, leading to a substantial increase—25 to 30%—in fuel consumption and plant size. Gas separation technology is generally a mature technology, and no major technology breakthroughs in this area are foreseen.

This is in great contrast to chemical looping combustion (CLC) where no gas separation is needed. CLC is a specific type of combustion reaction that was originally created in the 1950s to produce $CO_2$, but recently it has received increased attention as a potential $CO_2$ capturing process. In a CLC process, an oxygen carrier acts as an intermediate transporter of oxygen between air and fuel, and thus the air and the fuel are prevented from directly contacting one another. As a result, the exhaust gas stream ideally consists of $CO_2$ and $H_2O$ only, and the $CO_2$ is readily available after condensation of $H_2O$. Thus the energy requirement of gas-gas-separation is avoided.

In general, the overall heat of a CLC process will be the sum of the two heat states, exothermic during oxidation and endothermic during reduction, which is equivalent to the heat released in a convention combustion reaction. Accordingly, one advantage of the CLC process is that minimal extra energy is required to capture $CO_2$ while still maintaining a combustion efficiency similar to direct combustion processes. More precisely, there is minimal energy penalty for $CO_2$ capturing in a CLC process, estimated at only 2-3% efficiency lost. Additionally, $NO_x$ formation is reduced in the CLC process compared with direct combustion processes as the oxidation reaction occurs in the air reactor in the absence of fuel and at a temperature of less than 1200° C.—above which $NO_x$ formation increases considerably. Thus, the lack of $NO_x$ formation makes $CO_2$ capturing in CLC processes less costly compared with other combustion methods because $CO_2$ does not need to be separated from the NOx gas prior to capture. Overall, CLC is one of the few technologies today where a significant breakthrough could be envisaged for avoiding the large costs and energy penalty of gas separation in $CO_2$ capture.

A key factor for the CLC technology development is the selection of an oxygen carrier. Suitable oxygen-carriers must show high reaction rates and oxygen transport capacity, complete fuel conversion to $CO_2$ and $H_2O$, negligible carbon deposition, avoidance of agglomeration, sufficient durability, and good chemical performance. These properties must be maintained during several reduction and oxidation cycles. In addition, the cost of the oxygen-carrier is also important.

In a typical chemical looping combustion process, a solid metal oxide oxygen carrier is used to oxidize the fuel stream in a fuel reactor. Transition metal oxides such as nickel, copper, cobalt, iron, and manganese are good oxygen carrier candidates because of their favorable reductive and oxidative thermodynamic properties. Still, the effective use of metal oxides as oxygen carriers can make CLC processes costly. For instance, U.S. Pat. No. 5,447,024 claims as the active mass the use of redox pair NiO/Ni combined with the binder type yttriated zirconia in order to improve the mechanical strength and the reactivity of the particles. Using binder's type yttrium-zirconia increases the cost of the metal oxide and consequently the cost of a CLC process.

Black powder is regenerative and is formed inside natural gas pipelines as a result of corrosion of the internal walls of the pipeline. Black powder forms through chemical reactions of iron (Fe) in ferrous pipeline steel with condensed water containing oxygen, $CO_2$, and other gases. FIG. 1 shows an exemplary pipe 10 that has an outer surface and an opposing inner surface 12. Black powder 20 is shown collecting along the inner surface 12 of the pipe 10.

Black powder is mainly composed of iron hydroxides, iron oxides, and iron carbonates. As used herein including in the present claims, black powder refers to the residue (material) that is formed along inner surface of pipelines as a natural waste product as a result of corrosion and comprises a metal oxide. Black powder can also be collected from upstream filters employed in gas refineries.

For many years, pipeline companies have observed the presence of black powder and its effects, but have viewed it only as a nuisance and therefore have done little to understand it and use it. Instead, pipeline companies have primarily sought ways of removing the black powder from the pipelines. There are several methods to remove the black powder, such as separators and cyclones, where the black powder-laden gas passes through these devices and the black powder particles are physically knocked out of the gas stream. Specifically, the black powder particles are removed from the gas stream and attach to the walls of the device (e.g., separator, cyclone) where they fall and are collected at the bottom in a collection media.

Pipeline companies have yet to find a beneficial use for the black powder. Throughout the world, black powder from gas pipeline exists in large amounts, and is thus readily available at a very low cost due to its perceived lack of value. Today, black powder is generally discarded as waste.

Overall, there is a need for efficient $CO_2$ capture in the field of power generation in light of growing concerns regarding global warming. Further, there is a need to reduce the cost of current CLC processes, and in particular, reduce the cost of oxygen carriers utilized in CLC processes. Lastly, there is a need to utilize the black powder waste formed in gas pipelines.

SUMMARY

The present invention is directed to a cost-effective method for operating a chemical looping combustion (CLC) unit. More specifically, the present invention relates to a CLC process in which black powder which originates from gas pipelines is collected and is used as a low-cost, effective oxygen carrier in the CLC unit.

In one embodiment, the black powder is removed and collected from a gas pipeline using a separator or a cyclone device. Once the black powder is collected, it is then treated via a synthesis method, such as spray drying or freeze granulation, in order to adjust the spherical shape of the black powder to avoid attrition and fines production. Next, the black powder undergoes an activation treatment to increase its reactivity and produce the black powder oxygen carrier. In another embodiment, the black powder can also be mixed with other metal oxides to increase the reactivity of the black powder oxygen carrier.

In one embodiment, the activated black powder oxygen carrier is located in a bed (fluidized bed) within the fuel reactor of the CLC unit. In the fuel reactor, the black powder acts as an oxygen carrier for the combustion reaction with the fuel. The black powder oxygen carrier releases gas phase oxygen in the fuel reactor of the CLC unit, and has properties such that high amounts of gas phase oxygen are released. The release of gas phase oxygen in the fuel reactor can increase the reactivity towards the fuels and reduce the bed emission. The combustion reaction in the fuel reactor results in the reduction of the black powder oxygen carrier. Following the combustion reaction, the reduced black powder is then transported to the air reactor where it is oxidized by an injection of air. The resulting re-oxidized black powder is then recycled from the air reactor to the bed in the fuel reactor to again act as an oxygen carrier.

The black powder oxygen carrier can be used in a CLC method to react with different types of fuel, such as gaseous fuel, liquid fuel, and solid fuel. The CLC method of the present invention can also be used to produce energy, heat, syngas, and hydrogen, etc.

BRIEF DESCRIPTION OF THE DRAWINGS

A more complete understanding of the invention and its many features and advantages will be attained by reference to the following detailed description and the accompanying drawings. It is important to note that the drawings illustrates only a few embodiments of the present invention and therefore should not be considered to limit its scope.

DETAILED DESCRIPTION OF CERTAIN EMBODIMENTS

Figure 2:
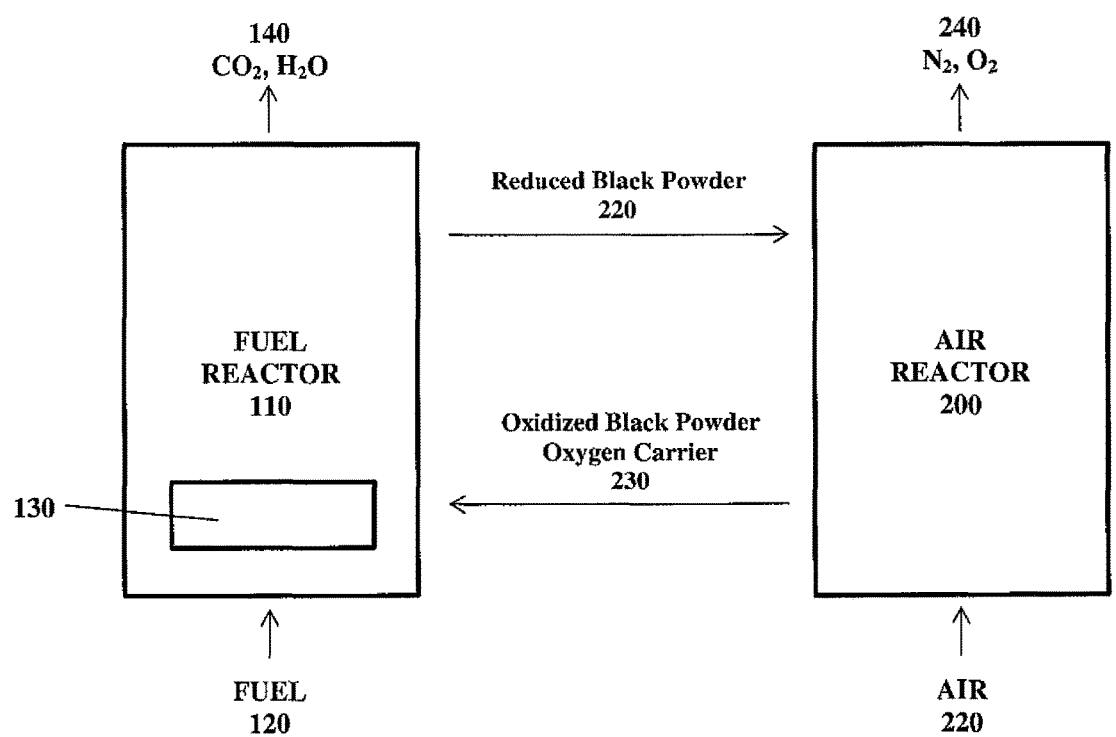
FIG. 2 is a schematic of a CLC process in accordance with an embodiment of the present invention.

As previously mentioned and with reference to FIG. 2, chemical looping combustion (CLC) typically employs a system in which an oxygen carrier is employed as a bed material providing the oxygen for combustion in a fuel reactor. The reduced oxygen carrier is then transferred to the air reactor and re-oxidized before being reintroduced back to the fuel reactor completing the loop. CLC thus uses two or more reactions to perform the oxidation of hydrocarbon based fuels. In its simplest form, an oxygen-carrying species (normally a metal) is first oxidized in air forming an oxide (e.g., a metal oxide). This oxide is then reduced using a hydrocarbon as a reducer in a second reaction.

The CLC system 100 shown in FIG. 2 consists of the traditional components of a CLC process. More specifically, the system 100 includes a fuel reactor 110 which receives a fuel (indicated at 120) which is combusted within the fuel reactor 110 under combustion conditions. As mentioned herein, the CLC system involves fluidization of the fuel by causing the fuel 120 to flow through an oxygen carrier 130 that is associated with the fuel reactor 110. For example, the oxygen carrier 130 can be in the form of a bed of material that is in fluid communication with the fuel reactor 110.

The product(s) of the combustion reaction that takes place in the fuel reactor 110 are generally shown at 140. The reaction products can include CO2, H2O, etc. The reaction products are removed from the fuel reactor for further processing and/or storage.

The oxygen carrier 130 produces oxygen and over time, this material is chemically reduced and must be oxidized to permit the material to continue to function as an oxygen provider. The looping of the CLC system 100 thus includes a loop for oxidizing the oxygen carrier 130. More specifically, an air reactor 200 is in selective fluid communication with the fuel reactor 110. A conduit 220 carries the reduced oxygen carrier 130 from the fuel reactor 110 to the air reactor 200. With the air reactor 200, an oxidizing agent 220, for example air, is introduced into the air reactor 200 and contacts the reduced oxygen carrier that resides in the air reactor 200 under conditions that result in oxidization of the oxygen carrier material. Once the oxygen carrier material is oxidized, the material is transported through a conduit 230 from the air reactor 200 to the fuel reactor 110 where it serves as an oxygen carrier and the looping process continues. The product(s) (e.g., N2, O2) of the oxidation reaction in the air reactor 200 are shown at 240 and are discharged from the air reactor 200.

The CLC process of the present invention is designed to use black powder—the waste material formed in natural gas pipelines (and other gas containing lines)—as an oxygen carrier (e.g., oxygen carrier 130 in FIG. 2). Because black powder is very rich in iron oxides, the present Applicant unexpectedly discovered that black powder can be used as an oxygen carrier in CLC processes. Specifically, black powder typically contains about 62% wt of magnetite (Iron (II,III) oxide [$Fe_3O_4$]); about 11.1% wt. of goethite ($\alpha$-FeO(OH)); about 18.8% wt. of akaganeite, (($\beta$-FeO(OH)), and about 5.4% wt. of siderite ($FeCO_3$). In terms of elementary measurement, black powder contains almost 65.5% wt. of iron, 26% wt. of oxygen, and the remaining weight is from other metals such as manganese, calcium, and silicon. Unless otherwise indicated, the percentages recited herein are weight percentages.

Figure 3:
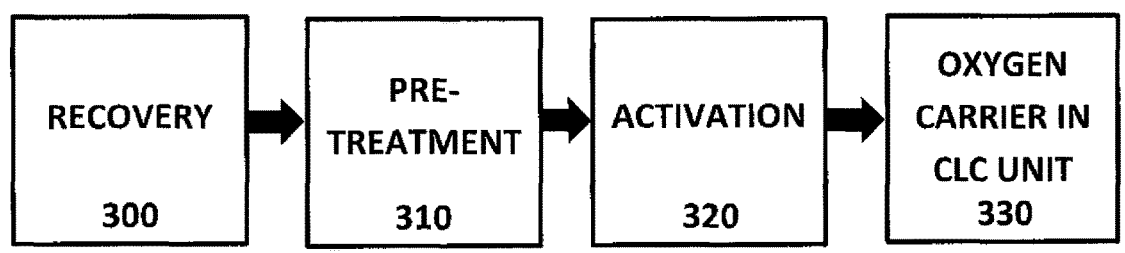
FIG. 3 is a schematic of the process of producing a black powder oxygen carrier in accordance with one embodiment.

FIG. 3 is a schematic of an exemplary flow process for using black powder as an oxygen carrier. FIG. 3 thus shows a series of steps (some optional). More specifically, FIG. 3 shows a step 300 which involves removal/recovery of the black powder from a source (e.g., pipeline); step 310 is a pre-treatment step; step 320 is an activation step; and step 330 is use of the treated/activated black powder in a CLC unit. Each of these steps is described in detail below.

Figure 1:
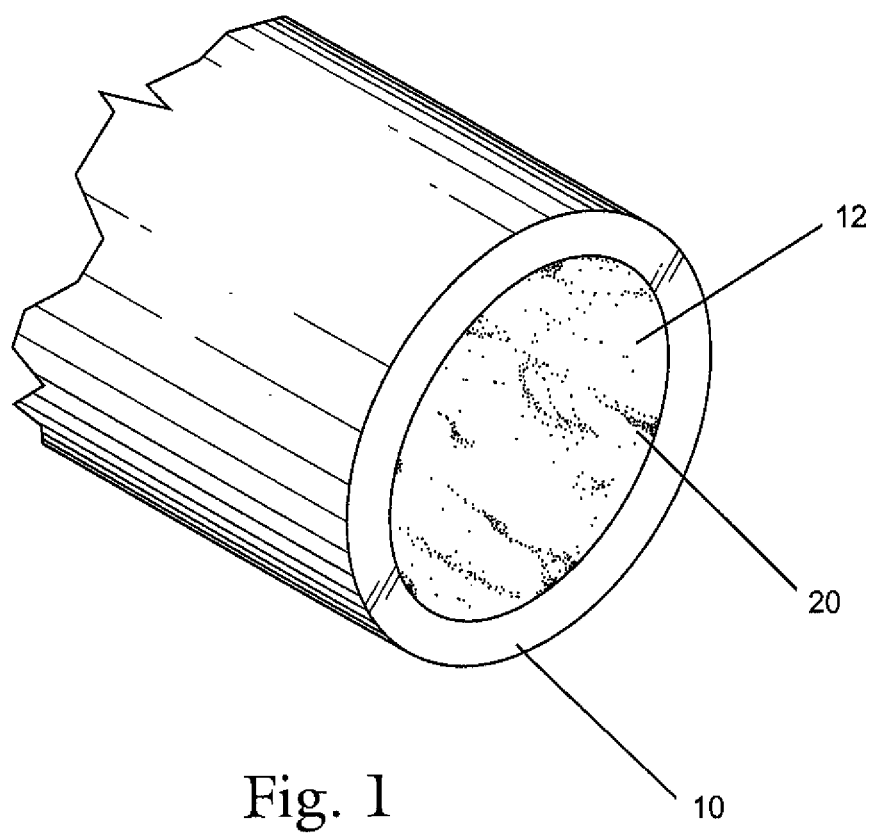
FIG. 1 is a perspective view of an end portion of a pipe that includes black powder formation along an inner surface thereof.

One method according to the invention utilizes the black powder after it is removed (recovered) from a gas pipeline (step 300). The black powder 110 (FIG. 1) can be collected from a pipeline (pipeline 100 in FIG. 1) (the origin location) or received from equipment downstream of the pipeline for use in a CLC process in a variety of ways. For instance, in one embodiment, black powder-laden gas passes through a separator where the black powder is "knocked off" onto the walls of the separator. The black powder then falls off the wall of the separator and collects at the bottom of the separator on a collection media. In another embodiment, a cyclone is used to remove the black powder from the pipeline.

It will therefore be appreciated that black powder material can be collected and recovered from its pipeline origin using any number of suitable techniques.

Once the black powder has been collected from the pipeline (step 300), it is then treated in a step 310 via a synthesis method (which can include spray drying or freeze granulation processes) in order to adjust its spherical shape to avoid attrition and fines production—both of which could limit the use of black powder in the CLC process. In other words, this step changes the physical characteristics of the black powder to optimize its use as an oxygen carrier in a CLC process.

In one embodiment of the treatment of black powder, oxygen via a synthesis method, a water-based slurry of a mixture, consisting of 60% black powder and 40% manganese oxide is prepared via a ball mill—a type of grinder in which the powder mixture and the ball are located inside a cylindrical container and the ball rotates around the cylinder thereby grinding the mixture into a fine powder. Prior to mixing with the manganese oxide, the black powder is heat treated at about 500° C. in order to remove possible organic contaminants. A small amount of dispersant is also added to this mixture in order to improve the slurry characteristics. After milling, an organic binder is added to the slurry to keep the particles intact during later stages in the production process (i.e., freeze-drying and sintering). Spherical particles are then produced by freeze-granulation. Specifically, the slurry is pumped to a spray nozzle where passing atomizing-air produces drops, which are sprayed into liquid nitrogen where they freeze instantaneously. The frozen water in the resulting particles is then removed by sublimation in a freeze-drier operating at a pressure that corresponds to the vapor pressure over ice at about—10° C. After freeze drying, the particles are sintered at a temperature of about 950° C. for 6 hours using a heating rate of about 50 degree C./min. Finally the particles are sieved to obtain particles of well-defined sizes.

In another embodiment of the synthesis method, a powder mixture of about 60.1% of black powder and about 39.9% manganese ore is dispersed in deionized water with organic additives that ensure proper dispersion and binding characteristics. For example and according to one embodiment, polyethyleneoxide (PEO, type PEO-1 Sumitomo Seika, Japan) and/or polyvinylalcohol (PVA 1500 Fluka, Switzerland) and/or polyethyleneglycol (PEG 6000, Merck-Schuchardt, Germany) were used as organic binder and Darvan (type C, R T Vanderbilt, USA) and/or Dolapix (types A88, PC75 and PC80, Zschimmer & Schwarz, Germany) and/or Targon 1128 (BK Giulini Chemie, Germany) were used as dispersants as part of the synthesis method. Appropriate (effective) amounts of the above materials are weighed before suspending in deionized water. The suspension is homogenized by milling in a planetary ball mill. The water-based suspension is continuously stirred with a propeller blade mixer while being pumped to a 2-fluid spray dry nozzle, positioned in the lower cone part of the spray drier. After spray drying, the fraction within the required particle size range is separated from the rest of the spray dried product by sieving the chamber fraction. In order to obtain an oxygen carrier with sufficient mechanical strength, sintering is performed for the samples at temperatures between about 950° C. and 1100° C. In one embodiment, a desired particle range is between about 0.08 mm to about 2 mm; however, other ranges are possible depending upon different parameters and different applications.

In preferred embodiments of the present invention and as shown in step 320, the black powder then preferably undergoes an activation process to increase the reactivity of the black powder as an oxygen carrier. In general, the activation method is a treatment in which a flue gas containing about 10 to 50% of CO and about 10 to 50% of $H_2$ is used to reduce the black powder. The use of this $CO/H_2$ gas activates the black powder particles by increasing their porosity and surface area for better gas-solid contact, thereby improving their reactivity towards other gas, liquid, or solid fuels. In one embodiment, the activation method consists of increasing the temperature to 500° C. for 12 to 48 hours, preferentially between 18 and 32 hours, under a flue gas media containing at least 21% of $O_2$. The flue gas as described above (i.e., containing at least 10-50% of $H_2$ and 10-50% of CO) is injected during 5 successive cycles where syngas is used as a fuel prior to the other gas, liquid, or solid fuel cycles. The syngas cycles are performed at 950° C., and can be followed by gas, liquid, or solid fuel cycles at the same temperature. Thereafter, the temperature can be increased to 1000° C. and 1050° C.

Thus, the activation step involves contacting and passing syngas through the black powder material to "activate" the black powder by making it more reactive towards other gas, liquid, or solid fuels. The result of this activation step is the formation of black powder oxygen carrier that is suitable for use in the CLC unit (looping process). Once this activation step is completed, fuel to be combusted is then run through the system (CLC unit), with the black powder serving as the oxygen carrier for the process.

Figure 4:
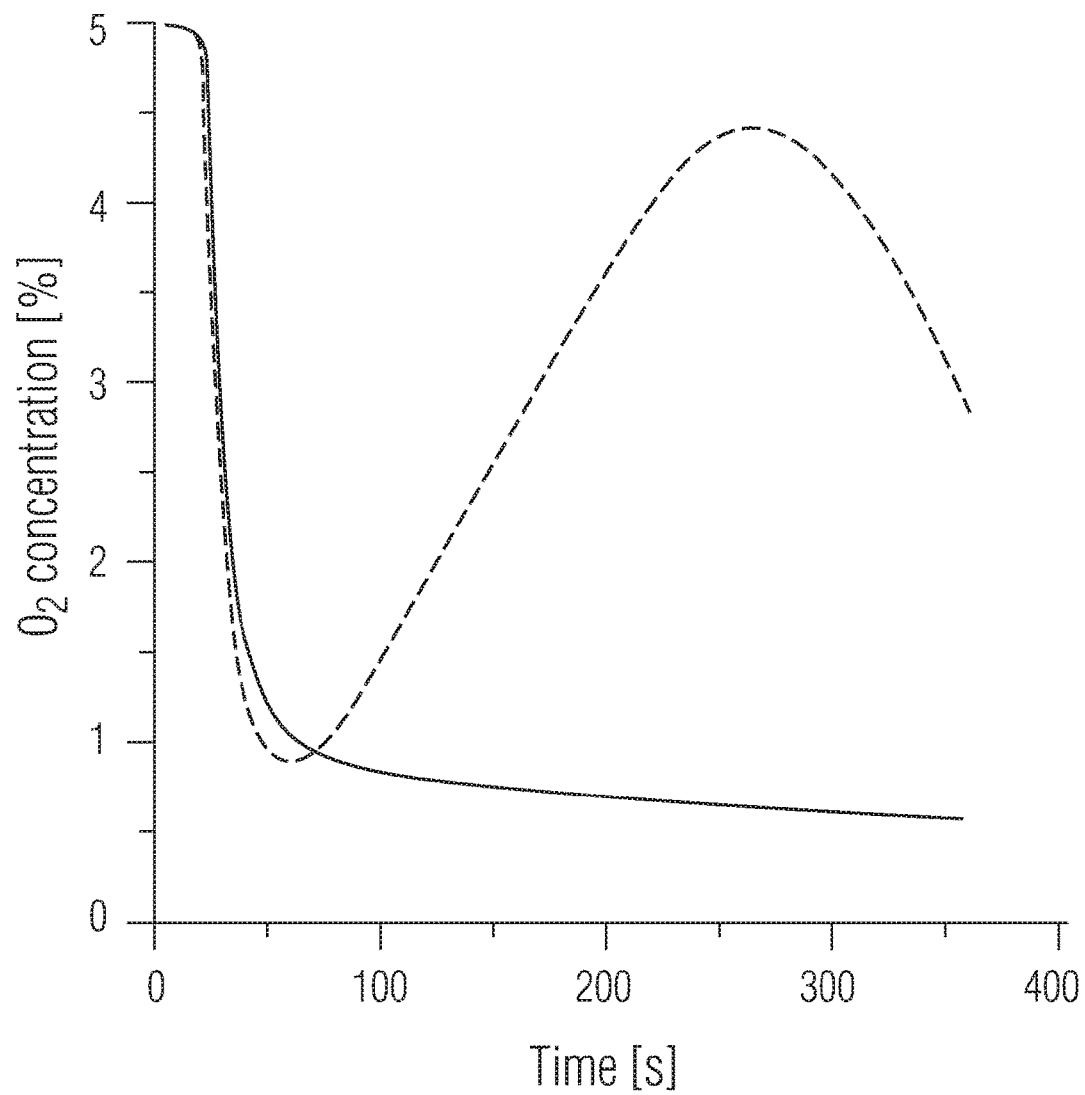
FIG. 4 is a schematic showing the oxygen release from black powder particles.

In another embodiment, the black powder can be mixed with one or more other active masses in order to increase its reactivity. More specifically, black powder can be mixed with one or more other metal oxide, including copper oxides and manganese oxides or a combination of both with different proportions (between about 10% and 80%, and preferentially between about 30% and 50%) to create an oxygen carrier with increased reactivity. Specifically, in one embodiment, the mixture is 60.1% black powder and 39.9% $Mn_3O_4$ (hereinafter referred to as SA7T1100). FIG. 4, stemming from an example using the mixture SA7T1100, shows the oxygen release from the particles in an inert atmosphere of oxygen. Time 0 indicates transition from an inert flow containing oxygen in $N_2$ to an inlet flow of 100% $N_2$. The solid lines represent oxygen release at a constant temperature of 900° C. and the dashed lines represent the oxygen release when the temperature is increased from 900° C. to 1000° C. The phenomena set forth in FIG. 4 is known as the CLOU effect, which is the ability of certain oxygen carriers to evolve gaseous oxygen at high temperature in the fuel reactor to avoid the direct contact between the fuel and the oxygen carrier. This will help in utilizing solid or liquid fuels with the need to gasify them.

In accordance with step 330, the black powder oxygen carrier produced in accordance with the present invention releases gas phase oxygen in the fuel reactor of the CLC unit. Further, the black powder oxygen carrier has properties such that high amounts of gas phase oxygen are released. Other advantageous properties of black powder oxygen carriers other than the activated CLOU effect include good mechanical strength after modification and treatment, no agglomeration even at 1000° C. The release of gas phase oxygen in the fuel reactor can increase the reactivity towards the fuels and reduce the bed emission, both of which increase the efficiency of the oxygen carrier.

As previously mentioned, in one preferred embodiment, the black powder oxygen carrier is located in a bed (fluidized bed) within the fuel reactor. The black powder oxygen carrier bed can be fluidized by a suitable fluid, such as a stream of $CO_2$ or by another suitable fluid stream (gas stream). In one embodiment, a stream consisting of both $CO_2$ and steam is used to fluidize the oxygen carrier bed. In the fuel reactor, the black powder acts as an oxygen carrier for the combustion reaction with the fuel. The black powder according to the present invention can be used in a CLC method to react with different types of fuel, such as gaseous fuel, liquid fuel, and solid fuel.

The combustion reaction in the fuel reactor results in the reduction of the black powder oxygen carrier. Following the combustion reaction, the reduced black powder is then transported to the air reactor where it is oxidized by an injection of air. The resulting re-oxidized black powder is then recycled from the air reactor to the bed in the fuel reactor to again act as an oxygen carrier.

In many embodiments, the CLC method of the present invention produces $CO_2$ and $H_2O$. The CLC method of the present invention can also be used to produce syngas, hydrogen, heat, or energy.

In an embodiment in which syngas is produced, the syngas can be used to produce liquid fuel such as dimethyl ether (DME)—a potentially renewable fuel. In order to produce the syngas, a high-pressure fixed bed technology must be utilized in accordance with a Fischer-Tropsch application.

In an embodiment in which hydrogen is produced, the hydrogen can be used in a number of ways, including: 1) in refining, 2) to produce energy, and 3) for hydrotreatment.

EXAMPLES

The following examples are provided to better illustrate embodiments of the present invention, but they should not be construed as limiting the scope of the present invention.

In the first example, the reactivity rates of different variations of black powder oxygen carriers (described above) are compared. Specifically, this example compares the reactivity rates of activated black powder, unactivated black powder, activated SA7T1100, and unactivated SA7T1100. The black powder, mainly consisting of $Fe_3O_4$, was collected from gas pipelines and was found in the upstream filters of gas refineries. The SA7T1100, as mentioned previously, is a mixture of 60.1% black powder and 39.9% $Mn_3O_4$. The reactivity of the activated material treated at 500° C. is investigated in a batch fluidized bed reactor using $CH_4$ as fuel under the following conditions: a) the mass of the particles for each group of oxygen carriers was 15g; b) the flow during reduction of the oxygen carrier (combustion of $CH_4$) was 450 mLn/min; c) the flow during oxidation of the oxygen carrier (5% $O_2$) was 900 mLn/min; and d) the temperature of the cycles was maintained at about 950° C. Prior to the cycles with $CH_4$ used as fuel, 5 activation cycles with syngas as the fuel were conducted. The syngas activation cycles were performed at 950° C. and they were followed by the aforementioned $CH_4$ cycles at the same temperature. Thereafter, the temperature was increased to 1000° C. At both 950° C. and 1000° C., 3 cycles with $CH_4$ were conducted. The experiment was started at 950° C. because this temperature gave the highest gas yield for all tested particles.

The reactivity of black powder was very high towards syngas, for both the "as is" black powder and the SA7T1100, with almost complete conversion of syngas to $CO_2$ after the second cycle with syngas. After the syngas reactivity test cycles, the particles' reactivity toward $CH_4$ was initially measured at 950° C. and then at 1000° C. The results (solid line) from these tests are presented in FIG. 5, where they were also compared to the conversion results (no line) prior to syngas activation at 950° C. In this figure, the results at 950° C. and the results at 1000° C. are distinguishable from one another using the legend key set forth in FIG. 5. As shown, the two uppermost curves represent the results at 1000° C., while the four bottommost curves represent the results 950° C.

Figure 5:
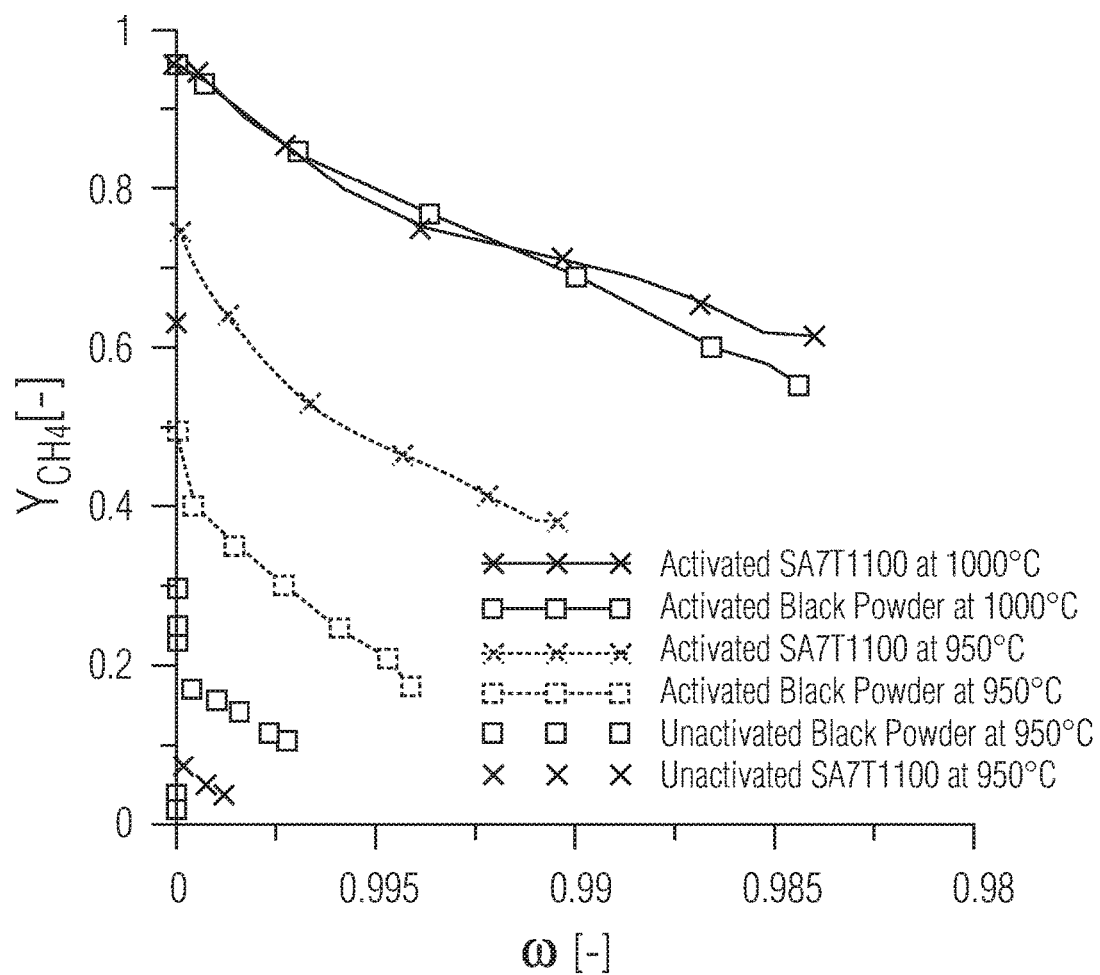
FIG. 5 is a schematic showing the reactivity of various black powder containing compositions toward $CH_4$.

As shown by FIG. 5, the activation of the "as is" black powder resulted in more than double the yield of $CH_4$ compared with unactivated "as is" black powder. This conversion reached a maximum of 50% at 950° C. for activated "as is" black powder compared with about 20% at the same condition for unactivated "as is" black powder. Activated SA7T1100, reaching a maximum of about 75% at 950° C., had an even more significant improvement compared with unactivated SA7T1100 at the same condition (about 10% at 950° C.). At 1000° C. both activated particles displayed a similar behavior with a maximum $CH_4$ conversion of above 95%. This example demonstrates that the activation of black powder substantially improves its reactivity and results in the formation of black powder oxygen carrier in that after the virgin black powder material undergoes the treatment and activation steps, it yields an oxygen carrier.

The second example thus illustrates an embodiment of black powder suitable for use as an oxygen carrier in accordance with the present invention. The non-treated black powder in this example has the composition as described by Table 1.

TABLE 1

Elemental Composition of Non-treated Black Powder

| Element | Weight (%) |
|---|---|
| C | 20.85 |
| O | 29.29 |
| Mg | 1.07 |
| Si | 0.41 |
| S | 1.88 |
| Cl | 2.10 |
| Ca | 1.23 |
| Fe | 43.06 |
| Total | 100.00 |

The non-treated black powder is then heated at 500° C. for 24 hours. The composition of the heated black powder material is given in Table 2.

TABLE 2

Elemental Composition of Black Powder (After Heating at 500° C.)

| Element | wt % |
|---|---|
| C | 0 |
| O | 25.39 |
| Mg | 1.08 |
| Si | 0.48 |
| S | 2.63 |
| Cl | 1.53 |
| Ca | 1.88 |
| Mn | 1.32 |
| Fe | 65.70 |
| Total | 100.00 |

The crushing strength of the non-treated black powder material is 2.25 N prior to heating and 2.68 N for the material heat treated at 500° C. In terms of elementary measurement, the black powder of this example, after heating at 500° C., contains almost 66% wt. of iron (Fe) and almost 26% wt. of oxygen (Table 2). The rest of the heated black powder consists of metals such as Mn, Ca, Si, and others.

Although the present invention has been described above using specific embodiments and examples, there are many variations and modifications that will be apparent to those having ordinary skill in the art. As such, the described embodiments are to be considered in all respects as illustrative, and not restrictive. Therefore, the scope of the invention is indicated by the appended claims, rather than by the foregoing description. All changes that come within the meaning and range of equivalency of the claims are to be embraced within their scope.

What is claimed is:

1. A process for combustion using a chemical looping combustion unit while producing a product stream comprising the steps of:
    forming a black powder oxygen carrier by,
        removing and collecting black powder that is formed in a gas pipeline;
        pre-treating the collected black powder; and
        activating the collected black powder to increase the reactivity and for the black powder oxygen carrier;
    delivering fuel into a fuel reactor that contains an oxygen carrier which comprises the black powder oxygen carrier;
    reducing the oxygen carrier in the presence of the fuel to provide gas-phase oxygen in the fuel reactor;
    combusting the fuel under oxycombustion conditions within the fuel reactor to produce a product stream;
    oxidizing the reduced oxygen carrier with air in the air reactor to produce the oxygen carrier; and
    delivering the oxidized oxygen carrier back to the fuel reactor.

2. The process of claim 1, wherein the black powder oxygen carrier comprises a fixed bed that is disposed in the fuel reactor and the fixed bed is fluidized by a stream of gas.

3. The process of claim 1, wherein the fuel is a fuel selected from the group consisting of a gas feed, a liquid feed, and a solid feed.

4. The process of claim 3, wherein the fuel is a solid fuel selected from the group consisting of coal and petcoke.

5. The process of claim 1, wherein the black powder comprises iron hydroxides, iron oxides, and iron carbonates recovered from gas pipelines.

6. The process of claim 1, wherein the black powder is removed from a gas pipeline and collected using at least one of a separator and cyclone device such that gas laden with black powder passes through the separator or cyclone, and black powder particles are knocked out of the gas stream to walls of the separator or cyclone, where they fall and are collected internally within the separator or cyclone in a collection media.

7. The process of claim 1, wherein the collected black powder is pretreated via a synthesis method.

8. The process of claim 7, wherein the synthesis method consists one of a spray drying process and a freeze granulation process.

9. The process of claim 1, wherein the activation of the black powder comprises the step of:
    using a flue gas to reduce the black powder and activate the black powder by increasing porosity and surface area of the black powder for improved gas-solid contact, thereby improving the reactivity of the black powder towards other gas, liquid or solid fuels.

10. The process of claim 9, wherein the flue gas contains at least 10-50% of $H_2$ and at least 10-50% of CO.

11. The process of claim 1, wherein the activation of the black powder comprises the step of mixing the black powder with one or more other metal oxides to increase the reactivity of the black powder.

12. The process of claim 11, wherein the other metal oxide comprises a copper oxide, manganese oxide or a combination thereof.

13. The process of claim 1, wherein the activation step includes passing a flue gas through the pre-treated black powder to produce the oxygen carrier, whereby the activation step increases porosity and surface area of the black powder for improved gas-solid contact, thereby improving the reactivity of the black powder towards other gas, liquid or solid fuels.

14. The process of claim 13, wherein the activation step is a multi-stage step in which the flue gas is injected into the chemical looping combustion unit in five consecutive cycles to activate the pre-treated black powder.

* * * * *